United States Patent [19]
Sogi et al.

[11] Patent Number: 5,884,574
[45] Date of Patent: Mar. 23, 1999

[54] AIR BAG FOR VEHICLE

[75] Inventors: Hidehito Sogi; Toru Ozaki, both of Osaka, Japan

[73] Assignee: Toyo Tire & Rubber Co., Ltd., Osaka, Japan

[21] Appl. No.: 828,786

[22] Filed: Mar. 27, 1997

[30]     Foreign Application Priority Data

May 17, 1996  [JP]  Japan ..................................... 8-123568

[51] Int. Cl.$^6$ ........................... B60R 21/16; D05B 97/00
[52] U.S. Cl. ......................................... 112/441; 280/743.1
[58] Field of Search .................... 112/441, 440; 280/743.1, 743.2, 728.1, 740

[56]              References Cited

U.S. PATENT DOCUMENTS

| | | |
|---|---|---|
| 2,052,630 | 9/1936 | Hoskwith . |
| 2,654,105 | 10/1953 | Roske . |
| 3,509,790 | 5/1970 | Hoppe . |
| 4,902,036 | 2/1990 | Zander et al. . |
| 5,275,434 | 1/1994 | Hirabayashi et al. ............... 280/743.1 |
| 5,393,092 | 2/1995 | Charns et al. . |
| 5,573,270 | 11/1996 | Sogi et al. ........................ 280/743.1 X |
| 5,584,508 | 12/1996 | Maruyama et al. ................. 280/743.1 |

*Primary Examiner*—Peter Nerbun
*Attorney, Agent, or Firm*—Jordan and Hamburg

[57]              ABSTRACT

An air bag for a vehicle has a peripheral part of an occupant-associated panel and a peripheral part of an inflator-associated panel stitched together. At portions of the peripheral part of each panel where constituent threads of a fabric of that panel and a contour line of the air bag are substantially parallel, the peripheral part of the other panel stitched thereto is curtailed to form a curtailed portion where threads and the contour are not parallel. As result, the thread-contour substantially parallel portions are easily bent by gas flow on inflation of the air bag and an amount of thread fraying occurring on inflation of the bag is reduced by the bending.

18 Claims, 5 Drawing Sheets

AIR BAG FOR VEHICLE

BACKGROUND OF THE INVENTION

This invention relates to an air bag of an air bag device for use in a vehicle as an occupant protection device.

An air bag device is a device which protects an occupant in the event of a vehicle collision by inflating an air bag, and comprises an inflator, which is a gas generator, and an air bag capable of inflation with gas from the inflator, installed, for example, in an instrument panel or in a central part of a steering wheel of a vehicle.

An air bag is made by stitching together peripheral parts of a plurality of panels made of flexible cloth or the like.

As the panels forming the air bag, so-called non-coated woven fabrics not coated with rubber or resin have been used, but when a non-coated woven fabric is cut by die cutting or knife cutting, at the cut ends, where the cut is almost parallel with a weave thread direction, there has been a tendency for warp or weft constituting the woven fabric to easily detach from the weave structure, i.e., for thread fraying to easily occur.

Because the cut ends are disposed inside the air bag, thread fraying has occurred due to viscous drag of gas flow produced by the inflator on inflation.

Conventionally, to prevent the thread fraying from occurring, as shown in FIG. 6, in an air bag 100 for a driver's seat, around the entire periphery of an occupant-associated panel 101 disposed on an occupant side and of an inflator-associated panel 102 disposed on an inflator side, the seam allowance (the distance from the seam 103 to the cut end) L has been made large (for example 20 mm or more). However, when the seam allowance L is made large around the entire periphery like this, the mass of the air bag becomes large and its bulk when folded also increases.

Also, conventionally, in cutting a non-coated woven fabric, thread fraying has sometimes been prevented by using laser cutting or the like and fusing the cut ends of the fabric. However, the use of a laser or the like leads to increased cost in productivity and equipment aspects.

SUMMARY OF THE INVENTION

It is therefore an object of the invention to provide an air bag for a vehicle in which thread fraying caused by viscous drag of gas flow on inflation is reduced so that functioning of the air bag is thereby maintained while mass and cutting cost are be reduced.

An air bag for a vehicle provided by the invention is made by stitching together peripheral parts of a plurality of panels made of a fabric not coated with rubber or resin, and is characterized in that where the panels are stitched together, at portions of a peripheral part of one of the panels where constituent threads of the fabric of that panel and a contour line of the bag are substantially parallel, a peripheral part of another panel stitched to this is curtailed to form a curtailed portion.

Because where the panels are stitched together, at portions of the peripheral part of a first panel where constituent threads of the fabric of that panel and the contour line of the bag are substantially parallel (namely, thread-contour substantially parallel portions) the peripheral part of a second panel stitched there to is curtailed in this way, the bending rigidity of the thread-contour substantially parallel portions of the first panel is small. This is because, as a result of the curtailed portions being formed, an amount of overlap of the thread-contour substantially parallel portions of the first panel and the peripheral part of the second panel where they are stitched together is small. Consequently, the thread-contour substantially parallel portions, which are portions where thread fraying occurs readily, are easily bent by gas flow on inflation and this bending reduces the viscous drag of gas flow acting on the thread-contour substantially parallel portions so that the amount of thread fraying occuring on inflation is reduced. Also, with this air bag, by means of the curtailed portions formed in the peripheral parts of the panels, it is possible to reduce the mass of the air bag compared to the conventional air bag described above, and also, because no special cutting equipment such as a laser is necessary, the cutting cost is low.

In an air bag for a vehicle of this invention, preferably, the plurality of panels consists of two substantially circular panels that are an occupant-associated panel and an inflator-associated panel that are stitched together with their weave directions inclined at 40° to 50° and an angle formed by straight lines connecting ends of each of the curtailed portions to a center of the respective panel is set to 45° to 80°.

In this case, because the two panels are substantially circular, each panel has four thread-contour substantially parallel portions arrayed in the circumferential direction. Since the two panels are stitched together with their weave directions inclined at 40° to 50°, the thread-contour substantially parallel portions of the two panels are arranged alternately in the circumferential direction. Because curtailed portions of one panel are positioned at the thread-contour substantially parallel portions of the other panel, the curtailed portions in each panel are formed in portions which are not thread-contour substantially parallel portions, that is, in portions which do not readily fray. Also, because the angle formed by straight lines connecting the ends of each of the curtailed portions to the center of the respective panel is set to 45° to 80°, the thread-contour substantially parallel portions project between the curtailed portions and are disposed with a predetermined spacing so that thread-contour substantially parallel portions of the two panels do not overlap. As a result, the thread-contour substantially parallel portions are easily bent by gas flow on inflation of the air bag.

As described above, the present invention provides an air bag for a vehicle that is made of a non-coated woven fabric, while keeping the mass and the cutting cost of the air bag low, which reduces thread fraying caused by viscous drag of gas flow on inflation to thereby maintain the functioning of the air bag.

DETAILED DESCRIPTION OF THE INVENTION

An air bag 10 of a preferred embodiment of the invention will now be described on the basis of FIG. 1 through FIG. 5.

The air bag 10 of this preferred embodiment is an air bag for a driver's seat.

An occupant-associated panel 12 and an inflator-associated panel 14 of the air bag 10 are each formed by die cutting or knife cutting a non-coated woven fabric into a substantially circular shape, with both of the panels 12, 14 being formed with the same diameter (diameter D=750 mm).

Figure 1:
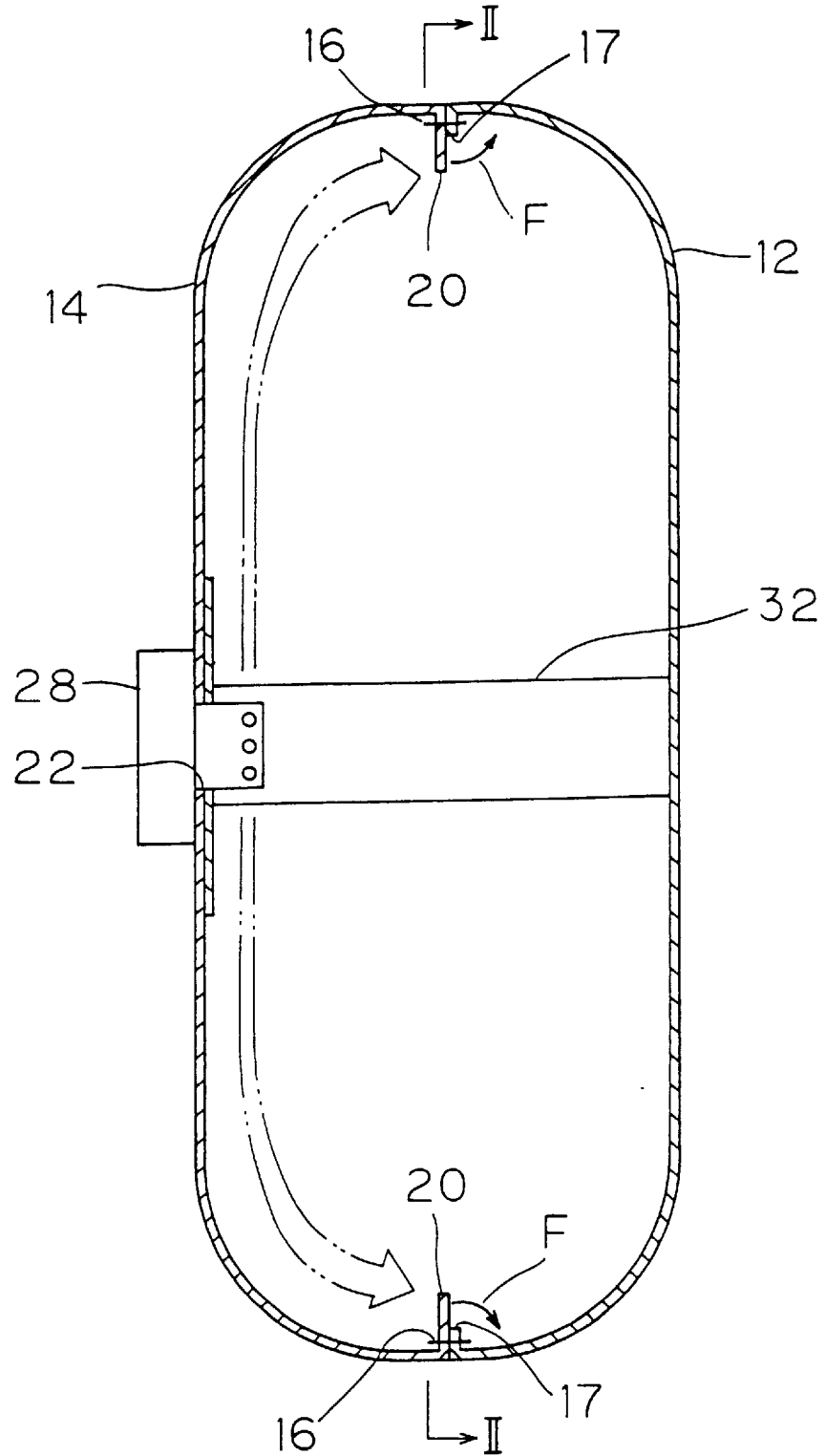
FIG. 1 is a sectional view of an air bag for a vehicle according to a preferred embodiment of the invention after inflation.
Figure 2:
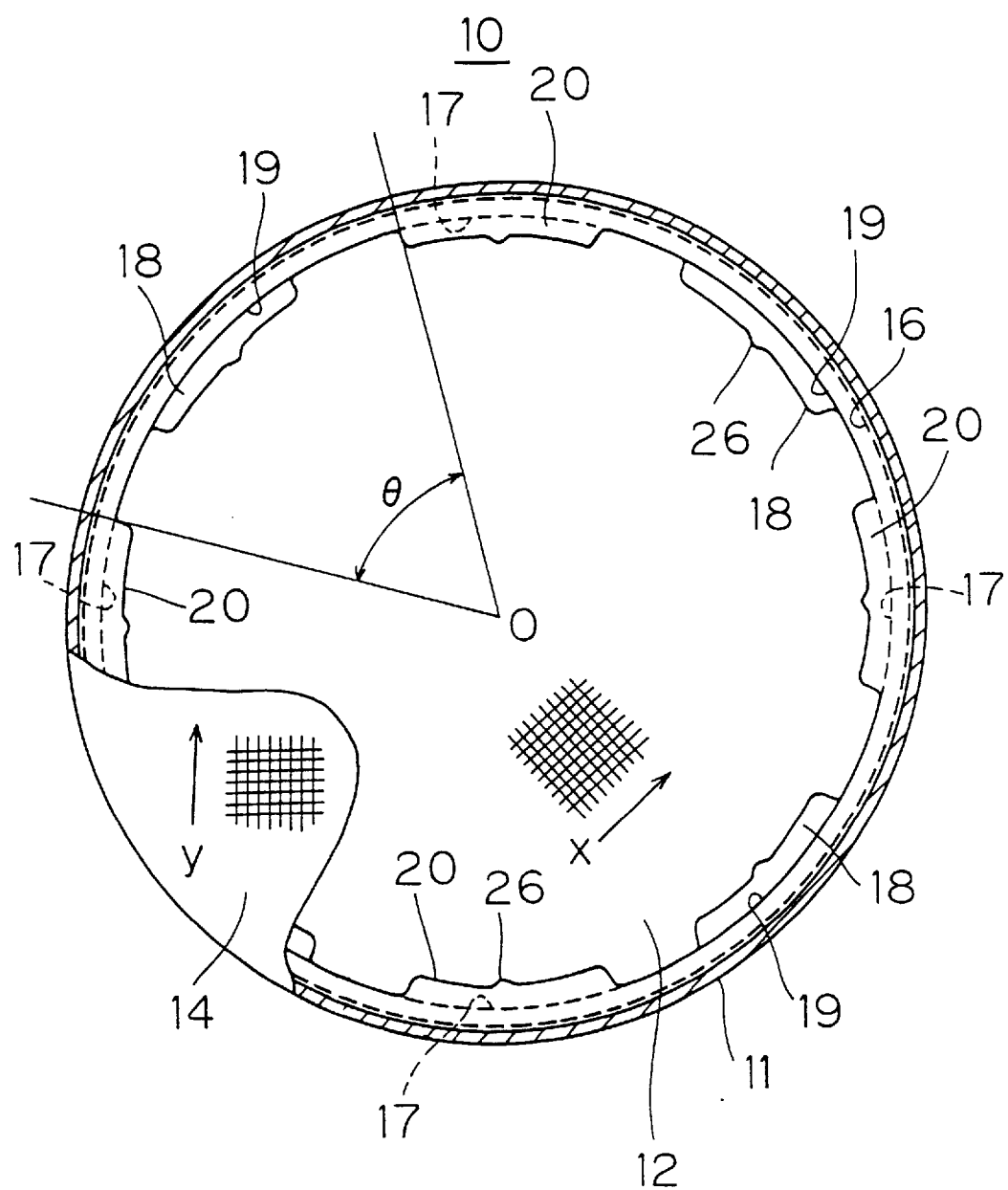
FIG. 2 is a sectional view on the line II—II in FIG. 1 with a part of an inflator-associated panel of the air bag left shown.
Figure 3:
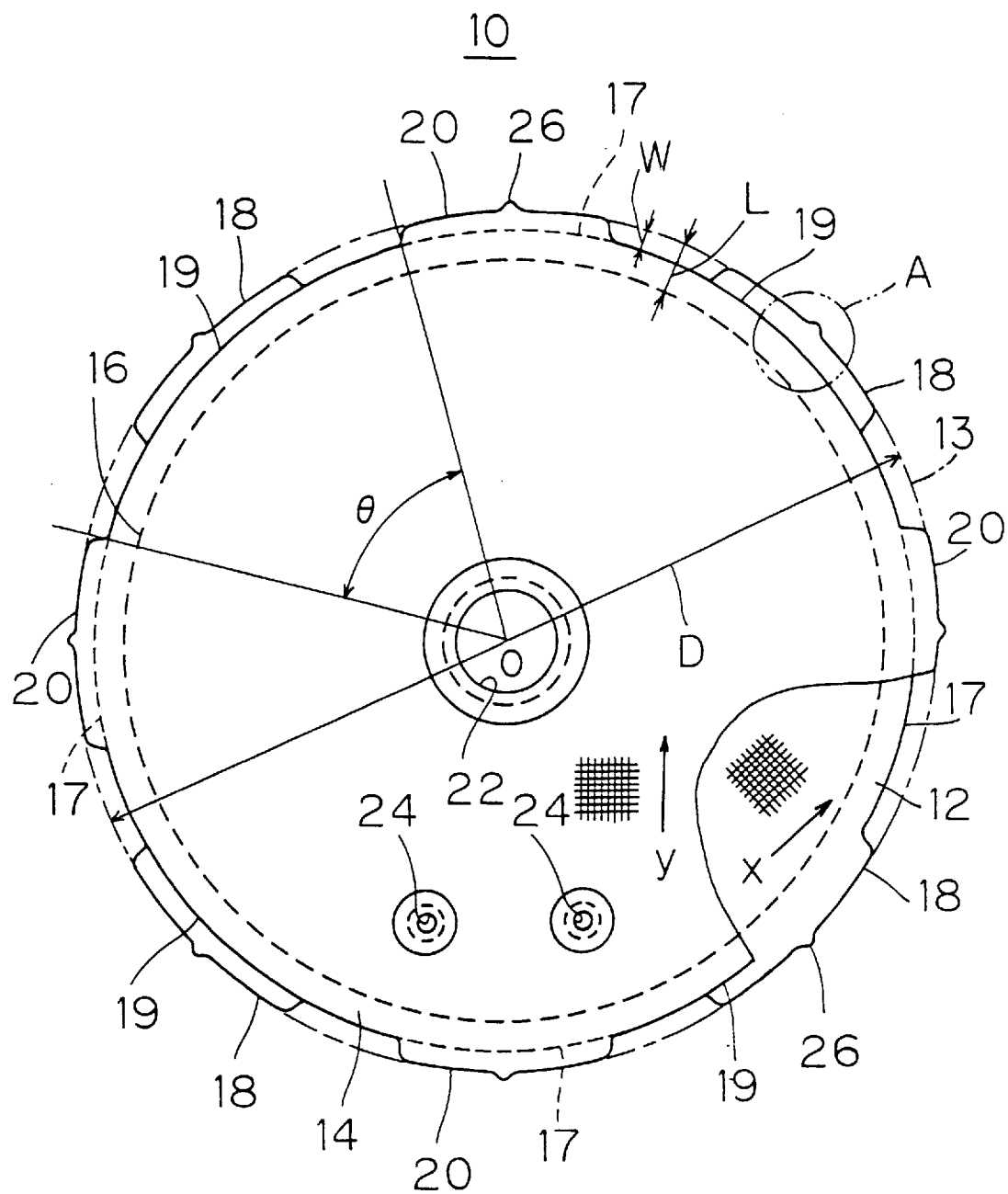
FIG. 3 is a plan view of an occupant-associated panel and the inflator-associated panel of the air bag stitched together and shown with part of the inflator-associated panel cut away.

As shown in FIG. 3, the two panels 12 and 14 are brought face-to-face so that their contour lines 13 are aligned and with the weave direction x of the occupant-associated panel 12 and the weave direction y of the inflator-associated panel 14 inclined at about 45° and peripheral parts of the two panels are stitched together, the stitched together panel are then turned inside-out so that the stitched peripheral parts of these two panels 12 and 14 are disposed on the inside of the air bag 10 as shown in FIG. 1 and FIG. 2. A seam allowance L, which is the distance from a circular seam 16 to contour lines 13, is set to 25 mm. This seam allowance L is preferably small, from the point of view of reducing the mass of the air bag 10.

In the panels 12, 14 there are portions (thread-contour substantially parallel portions) 18, 20 respectively in four locations in the circumferential direction where a warp or a weft of the fabric of the respective panel is substantially parallel with a contour line 11 of the air bag 10, and the thread-contour substantially parallel portions 18 of the occupant-associated panel 12 and the thread-contour substantially parallel portions 20 of the inflator-associated panel 14 are alternately disposed in positions mutually staggered by about 45°.

Where these two panels 12 and 14 are stitched together, at the thread-contour substantially parallel portions 18, 18 . . . of the occupant-associated panel 12, the peripheral part of the inflator-associated panel 14 is curtailed to form four curtailed portions 19, 19 . . . arrayed in the circumferential direction, and similarly, at the thread-contour substantially parallel portions 20, 20 . . . of the inflator-associated panel 14 the peripheral part of the occupant-associated panel 12 is curtailed to form four curtailed portions 17, 17 . . . arrayed in the circumferential direction.

Thus the curtailed portions 17, 19 provided in the two panels 12, 14 are all positioned at the thread-contour substantially parallel portions 18, 20 of the other panel 12, 14. Also, as mentioned above, the thread-contour substantially parallel portions 18, 20 of the two panels 12, 14 are disposed alternately. Therefore, the curtailed portions 17, 19 are all formed in portions of the panels 12, 14 which are not thread-contour substantially parallel portions 18, 20, i.e., in portions which do not readily fray.

Figure 4:
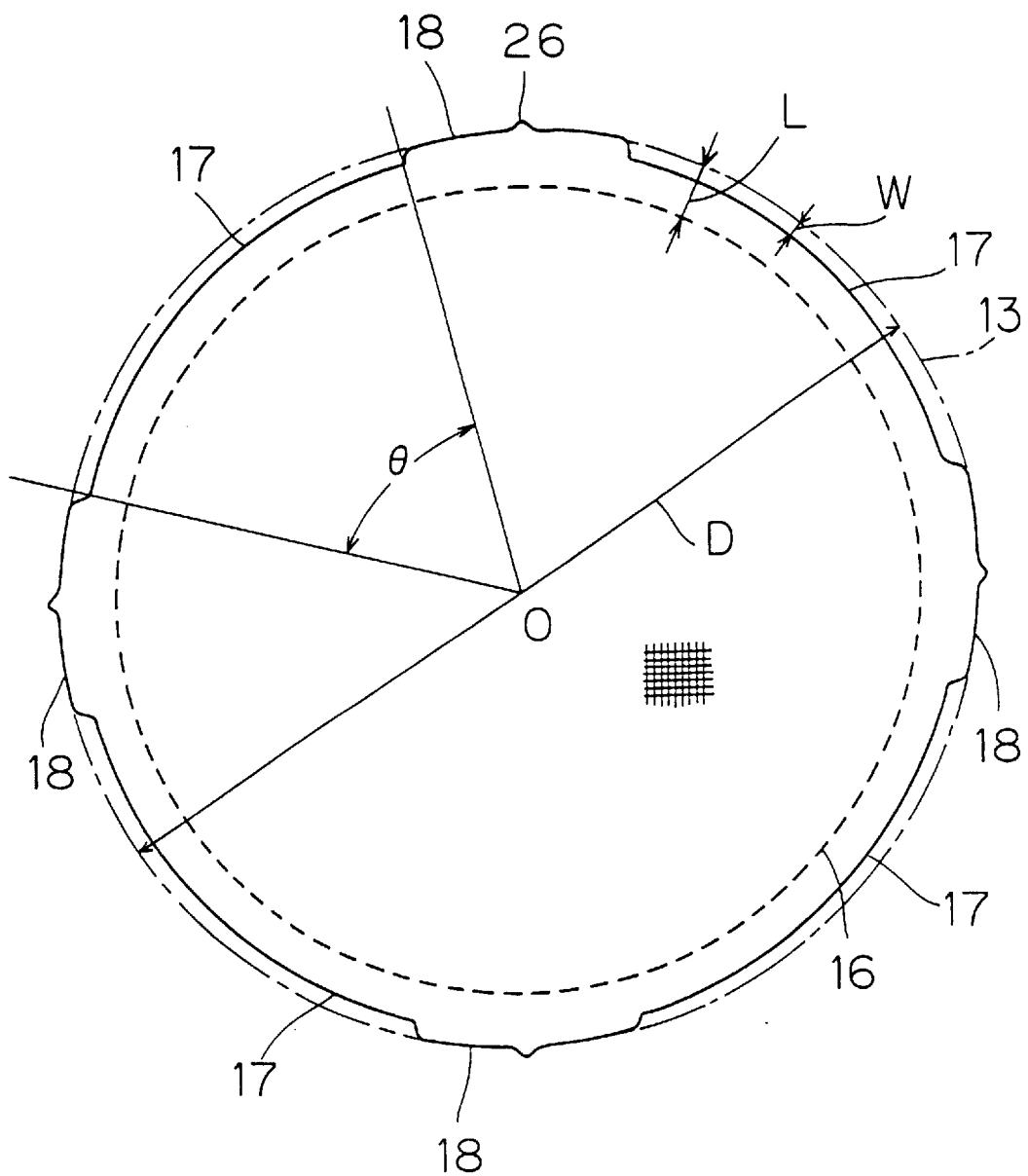
FIG. 4 is a plan view of the occupant-associated panel.

As shown in FIG. 4, the curtailed portions 17 of the occupant-associated panel 12 are formed by curtailing the peripheral part of the occupant-associated panel 12 from the contour line 13 thereof in the radial direction except for the four thread-contour substantially parallel portions 18, 18 . . . , and are disposed alternating with the thread-contour substantially parallel portions 18 in the circumferential direction of the air bag 10. These curtailed portions 17 are so formed that the portions where the contour line 13 and the warp or the weft of the fabric make contact in parallel, which are the portions which fray most easily, are positioned in the circumferential direction centers of the thread-contour substantially parallel portions 18.

The curtailed portions 17 each have a periphery curving in a circular arc, and the curtailment length W, which is the spacing between this periphery and the contour line 13, is set to 10 mm. The angle θ formed by the two straight lines connecting ends of each of the curtailed portions 17 and a center O of the occupant-associated panel 12 (hereinafter referred to as the curtailed portion sub-tended angle) is set to 60°. The remaining allowance of the curtailed portions 17 (the spacing between the periphery of the curtailed portion 17 and the seam 16) L–W is preferably 10 to 22 mm.

As shown in FIG. 3, the curtailed portions 19 of the inflator-associated panel 14 also, in the same way as the curtailed portions 17 of the occupant-associated panel 12, are formed by curtailing the peripheral part of the inflator-associated panel 14 except for the four thread-contour substantially parallel portions 20, 20 . . . , and their shapes are the same.

As shown in FIG. 2 and FIG. 3, when the two panels 12, 14 are stitched together, the thread-contour substantially parallel portions 18, 20 projecting from between the curtailed portions 17, 17 and 19, 19 are so alternately arranged with a predetermined spacing that the thread-contour substantially parallel portions 18 of the occupant-associated panel 12 do not overlap with the thread-contour substantially parallel portions 20 of the inflator-associated panel 14.

As shown in FIG. 3, the inflator-associated panel 14 has in its center a fixing hole 22 for fixing it to an inflator and has vent holes 24, 24 for allowing gas inside the air bag to flow out after inflation.

Figure 5:
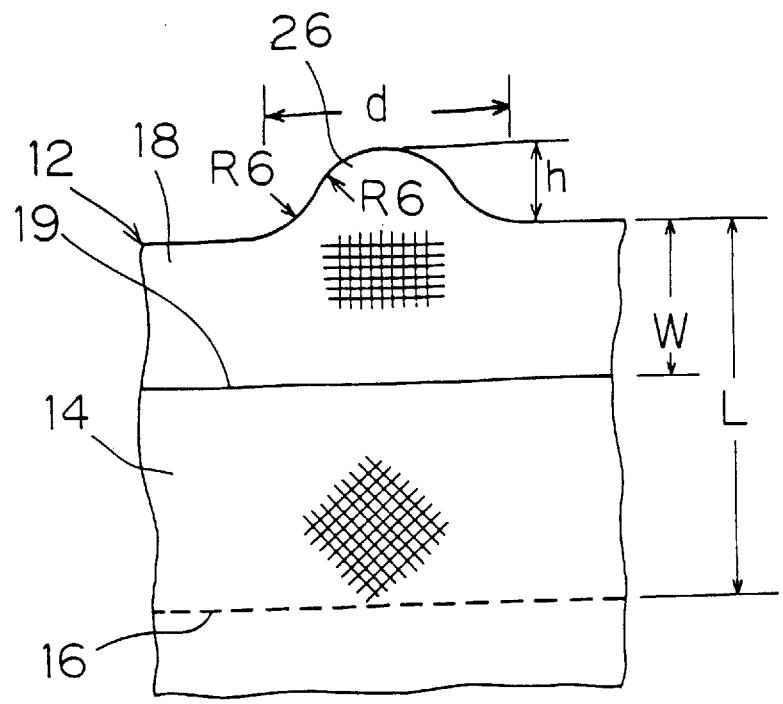
FIG. 5 is an enlarged view of part A in FIG. 3.
Figure 6:
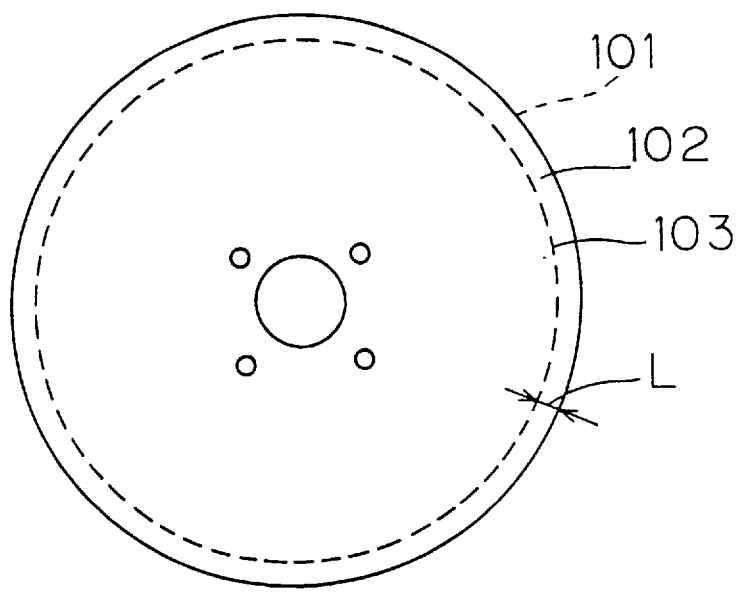
FIG. 6 is a plan view showing an occupant-associated panel and an inflator-associated panel of a conventional air bag stitched together.

Also, in the center of a circular arc of each of the thread-contour substantially parallel portions 18, 20 of the occupant-associated panel 12 and the inflator-associated panel 14 is formed a visible projecting portion 26 projecting outward. This projecting portion 26, as shown in FIG. 5, has a curvilinear contour shape formed by a circular arc of radius of curvature 6 mm; its height h in the direction in which it projects is set to 6 mm and its width d in the circumferential direction is 12 mm. So that this projecting portion 26 is to easy to see, its height h is preferably 4 to 10 mm and its width d is preferably 4 to 25 mm.

In FIG. 1, the reference numeral 28 denotes an inflator attached to the fixing hole 22 of the inflator-associated panel 14 and the reference numeral 32 denotes a tether for preventing the space between the occupant-associated panel 12 and the inflator-associated panel 14 from exceeding a predetermined length on inflation.

The operation of the air bag 10 on inflation will now be described.

As shown in FIG. 1, due to a flow of gas blown out from the inflator 28, a load acts on the peripheral parts of the two panels 12, 14 disposed inside the air bag 10. At this time, because in the air bag 10 at the thread-contour substantially parallel portions 20 (18) of each of the panels 14 (12), the peripheral part of the panel 12 (14) stitched to the thread-contour substantially parallel portions 20 (18) is curtailed, the thread-contour substantially parallel portions 20 (18) easily bend in a direction shown by an arrow F in FIG. 1. That is, because as a result of forming the curtailed portions 17, 19 the amount of overlap between the thread-contour substantially parallel portions 18, 20 of the peripheral part of each of the panels 12, 14 and the other panel 12, 14 is small and consequently the bending rigidity of the thread-contour substantially parallel portions 18, 20 is small, the thread-contour substantially parallel portions 18, 20 are easily bent by the gas flow.

As described above, with this air bag 10, because the thread-contour substantially parallel portions 18, 20 are easily bent by the gas flow on inflation of the air bag 10, the viscous drag of the gas flow acting on the thread-contour substantially parallel portions 18, 20 is reduced by this bending and threads tend to detach less. Consequently, the amount of thread fraying occurring on inflation decreases and the functioning of the air bag 10 is maintained. In particular, because the thread-contour substantially parallel portions 18, 20 forming projections between the curtailed portions 17, 19 are formed with a predetermined spacing such that those of the occupant-associated panel 12 do not overlap with those of the inflator-associated panel 14, compared to a case wherein they have overlapping portions, their bending rigidity is much smaller and consequently the thread fraying reduction effect is extremely good.

Also, because the thread-contour substantially parallel portions 18, 20 forming projections between the curtailed portions 17, 19 do not overlap at all in the circumferential direction, strength maintenance of the stitched parts of the air bag 10 is possible. This is because when thread fraying of the two panels 12, 14 occurs in the same place the fall in strength of that part is large, and as a result of making the thread-contour substantially parallel portions not overlap at all, even if thread fraying occurs at a position in one of the panels, thread fraying does not occur at a corresponding position in the other panel and consequently strength is maintained.

Also, as a result of the formation of the curtailed portions 17, 19, compared to the conventional air bag described above, it is possible to reduce the mass of the air bag while maintaining its functioning.

Furthermore, because the occupant-associated panel 12 and the inflator-associated panel 14 have a relatively simple shape, when die cutting is carried out the shape of the die is simple and die costs are low, so there is almost no increase in the cut length and therefore no increase in the capacity of the die cutting press is necessary. When knife cutting is carried out, because the cut shape is simple and there is almost no increase in the cut length, there is no increase in labor. Therefore, cutting is easy and cutting costs are low.

Also, the projecting portions 26 provided on the thread-contour substantially parallel portions 18, 20 make it easy to see the portions which fray easily, and consequently, during manufacture when the occupant-associated panel 12 and the inflator-associated panel 14 are brought face-to-face it is possible to superpose the two panels 12, 14 shifted with respect to each other through the above-mentioned predetermined angle easily.

In the air bag 10, the thread-contour substantially parallel portions 18, 20 where thread fraying tends to occur are left uncurtailed, to also provide a margin for thread fraying caused by gas flow during inflation.

In the air bag 10, the curtailed portion subtended angle θ of each of the curtailed portions 17, 19 of the occupant-associated panel 12 and the inflator-associated panel 14 is preferably $45° \leq \theta \leq 80°$ and more preferably $60° \leq \theta \leq 75°$. This is because when θ>80° the thread-contour substantially parallel portions 18, 20 are small and thread fraying increases and it is difficult to provide the above-mentioned thread fraying margin. In the preferred embodiment described above, the curtailed portion subtended angle θ is the same in both of the panels 12, 14, but the angle θ may differ between the panels 12, 14. From the above ranges of θ, it follows that the weave direction, as determined by either one of the warp threads and the weft threads, subtends a maximum angle relative to a tangent to the cut edges in ranges of 5° to 22.5° and, preferably, of 7.5° to 15° at the thread-contour substantially parallel portions.

The angle formed by the weave directions of the panels 12, 14 when the two panels 12, 14 are stitched together is preferably above 40° and below 50°. If the angle is in this range, in the panels 12 and 14, the curtailed portions 17, 19 can be formed in parts which are not the thread-contour substantially parallel portions 18, 20, i.e., parts where thread fraying does not easily occur.

The present invention is not limited to application to an air bag for a driver's seat and can also be applied to an air bag for a passenger's seat or for another location, and the shapes of the occupant-associated panel and the inflator-associated panel also are not limited to the circular shape described above.

What is claimed is:

1. An air bag for a vehicle made by stitching together peripheral parts of a plurality of panels made of a fabric not coated with rubber or resin, wherein at a portion of the peripheral part of one panel where constituent threads of the fabric of that panel and a contour line of the air bag are substantially parallel, the peripheral part of another panel of said plurality of panels is stitched to said one panel and is curtailed relative to said portion of said peripheral part of said one panel to form a curtailed portion.

2. The air bag for a vehicle according to claim 1, wherein the plurality of panels consists of two substantially circular panels that are an occupant-associated panel and an inflator-associated panel, the two panels are stitched together with their weave directions inclined at 40° to 50° and an angle formed by straight lines connecting ends of the curtailed portion to a center of the respective panel is 45° to 80°.

3. An air bag comprising:
   at least first and second panels of woven material having warp and weft threads, said first and second panels being stitched together by stitching along a seam line;
   said first and second panels each having a peripheral margin extending from said seam line to form cut edges of said first and second panels;
   said peripheral margins each having thread substantially parallel portions whereat one of said warp threads and said weft threads are substantially parallel to said cut edges, said thread substantially parallel portions having a first width extending from said seam line to said cut edges;
   said peripheral margins each having curtailed portions between said thread substantially parallel portions, said curtailed portions having a second width extending from said seam line to said cut edges, and said second width being less than said first width; and
   said first and second panels being stitched together such that said thread substantially parallel portions of said first panel are aligned with said curtailed portions of said second panel and said thread substantially parallel portions of said second panel are aligned with said curtailed portions of said first panel.

4. The air bag of claim 3 wherein said first panel has a first thread direction defined by a direction of one of said warp and said weft threads of said first panel, said second panel has a second thread direction defined by a direction of one of said warp and said weft threads of said second panel, and said first and second panels are stitched together such that said first thread direction and said second thread direction subtend an angle in a range of about 40° to about 50°.

5. The air bag of claim 4 wherein said first and second panels are substantially circular, said curtailed portions of said first and second panel have first and second circumferential ends, and virtual lines extending from said first and second circumferential ends to centers of said first and second panels subtend an angle in a range of about 45° to about 80°.

6. The air bag of claim 4 wherein said first and second panels are substantially circular, said curtailed portions of said first and second panel have first and second circumferential ends, and virtual lines extending from said first and second circumferential ends to centers of said first and second panels subtend an angle in a range of about 60° to about 75°.

7. The air bag of claim 3 wherein said first and second panels are substantially circular, said curtailed portions of said first and second panel have first and second circumferential ends, and virtual lines extending from said first and second circumferential ends to centers of said first and second panels subtend an angle in a range of about 45° to about 80°.

8. The air bag of claim 3 wherein said first and second panels are substantially circular, said curtailed portions of said first and second panel have first and second circumferential ends, and virtual lines extending from said first and second circumferential ends to centers of said first and second panels subtend an angle in a range of about 60° to about 75°.

9. The air bag of claim 3 wherein said first width is 25 mm.

10. The air bag of claim 3 wherein said second width is 10 mm less than said first width.

11. The air bag of claim 3 wherein said second width is in a range of 10 mm to 22 mm.

12. The air bag of claim 3 wherein said first width is 25 mm and said second width is in a range of 10 mm to 22 mm.

13. The air bag of claim 3 wherein one of said warp threads and said weft threads subtends a maximum angle relative to a tangent to said cut edges in a range of 5° to 22.5° at said thread substantially parallel portions.

14. The air bag of claim 3 wherein one of said warp threads and said weft threads subtends a maximum angle relative to a tangent to said cut edges in a range of 7.5° to 15° at said thread substantially parallel portions.

15. The air bag of claim 3 wherein one of said warp threads and said weft threads subtends an angle relative to a tangent to said cut edges in a range of 0° to 5° at said thread substantially parallel portions.

16. The air bag of claim 3 wherein one of said warp threads and said weft threads subtends an angle relative to a tangent to said cut edges in a range of 0° to 7.5° at said thread substantially parallel portions.

17. The air bag of claim 3 wherein one of said warp threads and said weft threads subtends an angle relative to a tangent to said cut edges in a range of 0° to 15° at said thread substantially parallel portions.

18. The air bag of claim 3 wherein one of said warp threads and said weft threads subtends an angle relative to a tangent to said cut edges in a range of 0° to 22.5° at said thread substantially parallel portions.

* * * * *